United States Patent [19]

Vegners

[11] 3,770,075
[45] Nov. 6, 1973

[54] FREE WHEELING 2-SPEED MOTOR WHEEL

[75] Inventor: Edgar Z. Vegners, Mound, Minn.

[73] Assignee: Eaton Corporation, Cleveland, Ohio

[22] Filed: Mar. 20, 1972

[21] Appl. No.: 236,416

[52] U.S. Cl.................. 180/66 F, 74/792, 180/43 B
[51] Int. Cl............................................. B60k 7/00
[58] Field of Search.............. 180/66 F, 44 F, 44 M, 180/43 B; 74/791, 792, 812

[56] References Cited
UNITED STATES PATENTS

| | | | |
|---|---|---|---|
| 3,184,994 | 5/1965 | Stahl............................ | 180/43 B X |
| 3,251,243 | 5/1966 | Kress................................. | 74/792 X |
| 2,588,187 | 3/1952 | Weiser............................. | 74/812 X |
| 2,738,849 | 3/1956 | Nubung............................ | 180/66 R |
| 2,591,363 | 4/1952 | Kraft et al......................... | 74/791 X |
| 2,935,901 | 5/1960 | Petronovich......................... | 74/792 |
| 3,458,005 | 7/1969 | Malm et al.................... | 180/43 B X |
| 2,939,344 | 6/1960 | Harris...........:.................. | 180/43 B |
| 3,422,917 | 1/1969 | Guinot............................... | 180/44 F |
| 3,272,279 | 9/1966 | Budzich............................ | 180/44 M |

*Primary Examiner*—Kenneth H. Betts
*Assistant Examiner*—David M. Mitchell
*Attorney*—Thomas E. Davis

[57] ABSTRACT

A motor wheel for use in a ground engaging drive wheel of a vehicle includes a hydraulic motor disposed in a housing, the output shaft of the motor is connectable through a complex planetary gearing and clutch arrangement to drive a casing which is rotatably mounted relative to the housing. The driving force from the output shaft of the hydraulic motor is transmitted to a planetary gear set by means of an arcuately configured sun gear formed on one end of the drive shaft, the planetary gears are disposed about the sun gear to transmit the driving force to a ring gear mounted in the casing. A planetary carrier is disposed in the casing for supporting the planetary gears during relative rotative movement about the sun gear. The planetary carrier is normally disposed in an initial neutral position for free rotative motion relative to both the casing and the housing to thereby provide free wheeling of the motor wheel. The planetary carrier is axially slidable relative to the sun gear and ring gears in either direction from the neutral position to thereby provide a high speed and a low speed gear ratios. Driving engagement between the carrier and the housing is established upon movement of the carrier in one direction from the neutral position and driving engagement between the carrier and the casing is established upon movement of the carrier axially in the other direction from the neutral position. Springs are provided to maintain the carrier normally centered and out of engagement with either the casing or the housing to provide the free wheeling condition of said wheel motor. Hydraulically actuated annularly shaped clutch pistons are disposed in recesses in the casing and housing respectively and are operable upon the application of fluid pressure thereto to move the carrier into driving engagement with either the housing or the casing to thereby provide a hydraulically operated motor wheel having both direct and low speed driving ratios as well as free wheeling. Valve means are provided to part pressurized hydraulic fluid for actuating the pistons and to simultaneously reverse fluid flow through the hydraulic motor upon actuation thereof to provide the required direction of rotation of the hydraulic motor.

11 Claims, 7 Drawing Figures

PATENTED NOV 6 1973 3,770,075

FREE WHEELING 2-SPEED MOTOR WHEEL

BACKGROUND OF THE INVENTION

This invention relates generally to a hydraulically actuated motor wheel and control system for a ground engaging wheel of a vehicle. More specifically, this invention relates to a hydraulically actuated motor wheel having a planetary gear set and control system therefore and wherein selectively actuatable hydraulically operated clutches are provided to lock the carrier of the planetary gear set to either a stationary housing or a rotatable casing to provide a plurality of speed ratios in a motor wheel of the type to which this invention relates.

Hydraulically driven motor wheels are known in the art. More specifically, hydraulically driven motor wheels having a planetary gear set and a single hydraulically actuated clutch are also known in the art. One disadvantage of this type of system was that the motor wheel was only capable of providing either free wheeling or one set drive ratio. Thus, prior art motor wheels of the type to which this invention relates could not provide a sufficient range of both mechanical advantages in the form of output torque and high rotational speeds to cover a wide range of operating conditions. The most pertinent example of this type of prior art known to the applicant is U.S. Pat. No. 3,458.005 issued July 29, 1969 to D.I. Malm et al.

Further, hydraulically actuated motor wheels having change speed gearing and variable ratio hydraulic motors are also known in the art. Examples of these devices are shown in U.S. Pat. Nos. 3,270,826 issued Sept. 6, 1966 to Middlesworth et al., 3,469,646 issued Sept. 30, 1969 to O'Connor and 3,391,753 issued July 9, 1968 to Anderson.

However, to date no one has provided a hydraulically actuated motor wheel having planetary gearing and including a plurality of hydraulically actuated clutches and wherein a normal unactuated position the carrier of the planetary gear set is freely rotatable to provide a free wheeling feature to the wheel motor and wherein the carrier of the planetary gear set is axially slidable into clutching engagement with either a stationary or rotating portion of the motor wheel to provide a plurality of speed ratios therein.

SUMMARY OF THE INVENTION

According to the present invention, an improved hydraulically actuated wheel motor drive system is provided for use on a vehicle and wherein the wheel motor is operable to provide a plurality of output speed ratios by means of selectively actuatable clutches which lock the carrier of the planetary gear set to either a stationary or rotating portion of the motor wheel.

The motor wheel includes a geroter type hydraulically actuated fluid motor. The fluid motor operating mechanism includes an internally toothed ring member and an externally toothed star member disposed eccentrically within the ring member for rotational and orbital movement thereto. The teeth of the members intermesh to form expanding and contracting fluid chambers upon relative orbital and rotational movement therebetween. Valve means are drivingly connected to the internally toothed star member whereby hydraulic fluid under pressure may be admitted to or exhausted from the expanding and contracting chambers in synchronism with either orbiting or rotating movement of the star member. The fluid motor is disposed within a housing of the motor wheel which is adapted to be mounted on a vehicle. The motor wheel further includes a casing rotatably disposed relative to the housing and a planetary gear set. Disposed within the casing is a floating drive shaft having one end drivingly connected to the star member of the fluid motor. The other end of the drive shaft is configured to provide a sun gear for the planetary gear set. Planetary gears are provided to transmit driving rotation between the sun gear and a ring gear disposed in the housing. The planetary gears are rotatably supported relative to a planetary gear carrier in the casing. The planetary gear carrier is axially slidable within the casing in either direction from an initial neutral position. The planetary carrier includes a first clutch surface adapted to engage a corresponding clutch surface on the housing upon axial movement of the carrier in one direction from the initial neutral position and a second clutch surface adapted to engage a corresponding clutch surface on the casing upon axial movement of the carrier in the other direction from the initial neutral position. Springs are provided on either side of the carrier to maintain the carrier in the initial neutral position. Clutch actuating pistons are provided on either side of the carrier to enable the carrier to be selectively moved into clutching engagement with either the housing or the casing by selective application of fluid pressure behind the pistons.

Because grounding of the carrier to the housing as opposed to grounding it to the casing would result in reversing the direction of rotation of the drive wheel, valve means and hydraulic system are provided to automatically and simultaneously reverse the direction of fluid flow through the motor depending on which clutch actuating piston is being pressurized.

One feature of this arrangement is that it provides an extremely compact motor wheel which may be used in vehicle wheels of any type and wherein the motor wheel is operable to provide a plurality of output gear ratios while maintaining the compact design.

Another object of this invention is to provide a hydraulically actuated motor wheel wherein a planetary carrier of a planetary gear set is axially slidable under the influence of hydraulic pressure to provide a plurality of output speed ratios.

DESCRIPTION OF THE PREFERRED EMBODIMENT

Figure 1:
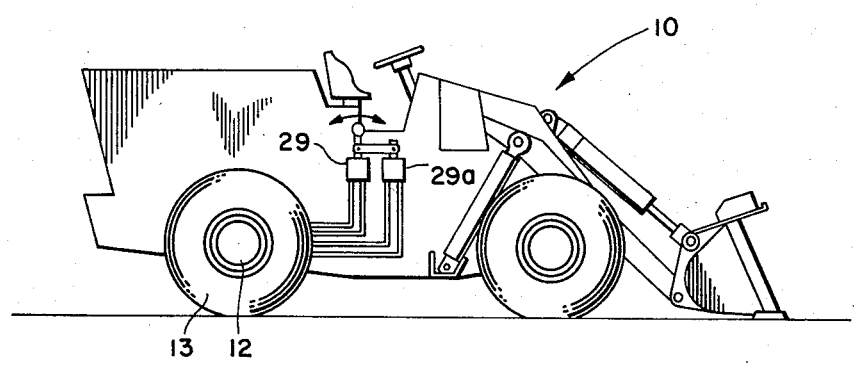
FIG. 1 shows the motor wheel and control system of the present application disposed in a vehicle.

With reference to FIG. 1 there is shown a vehicle 10 having a motor wheel 12 disposed within the hub of a ground engaging drive wheel of the vehicle 10.

Figure 2:
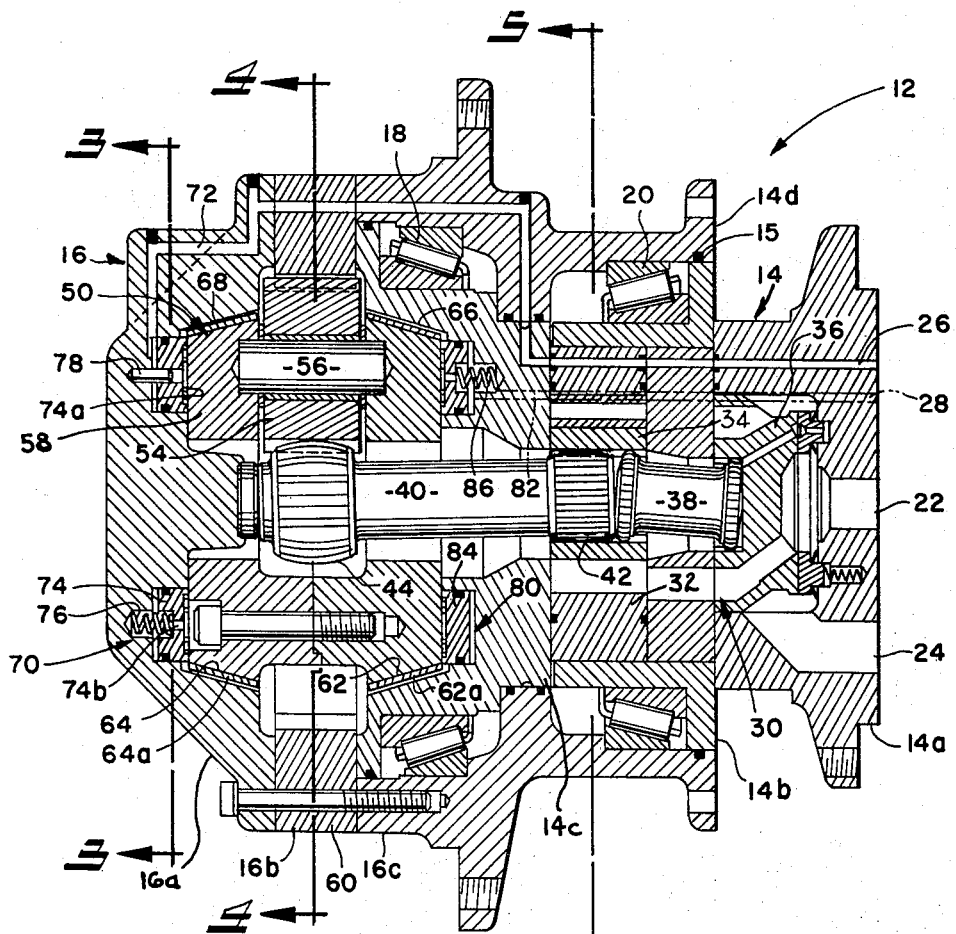
FIG. 2 is a cross sectional view taken axially along the center line of the motor wheel of the present invention showing the internal construction thereof.
Figure 3:
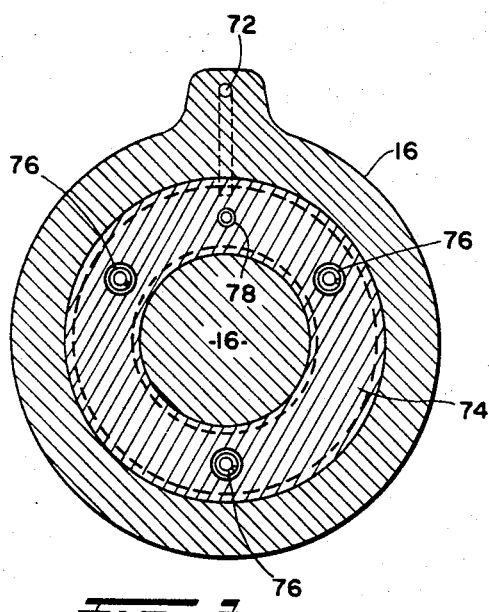
FIG. 3 is a sectional view taken along the line 3—3 of FIG. 2 showing further details of the motor wheel of the present invention.
Figure 6:
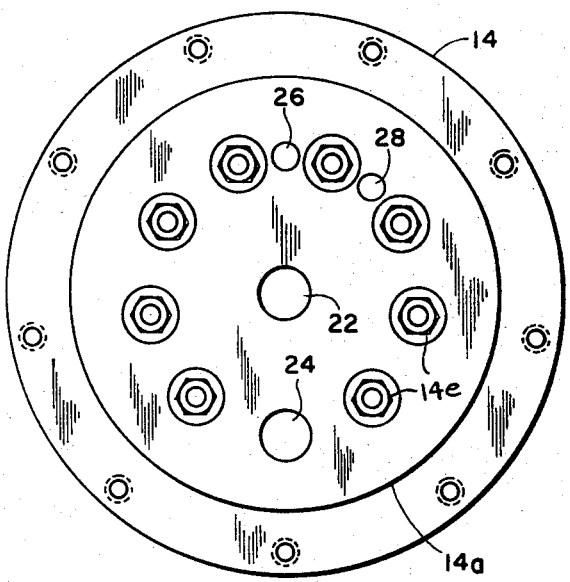
FIG. 6 is an end view of the motor shown in FIG. 2.
Figure 4:
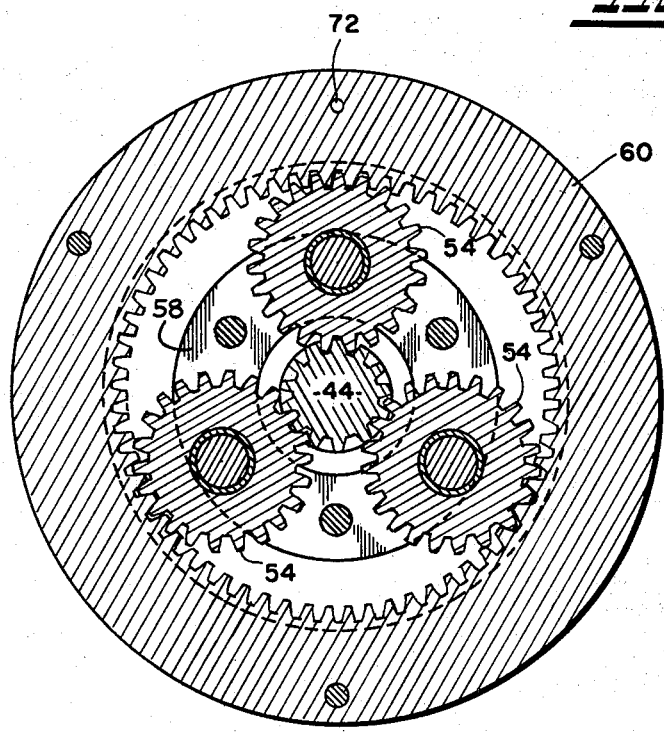
FIG. 4 is a cross sectional view taken along the line 4—4 of FIG. 2 showing further details of the internal construction of the motor wheel of the present invention.
Figure 5:
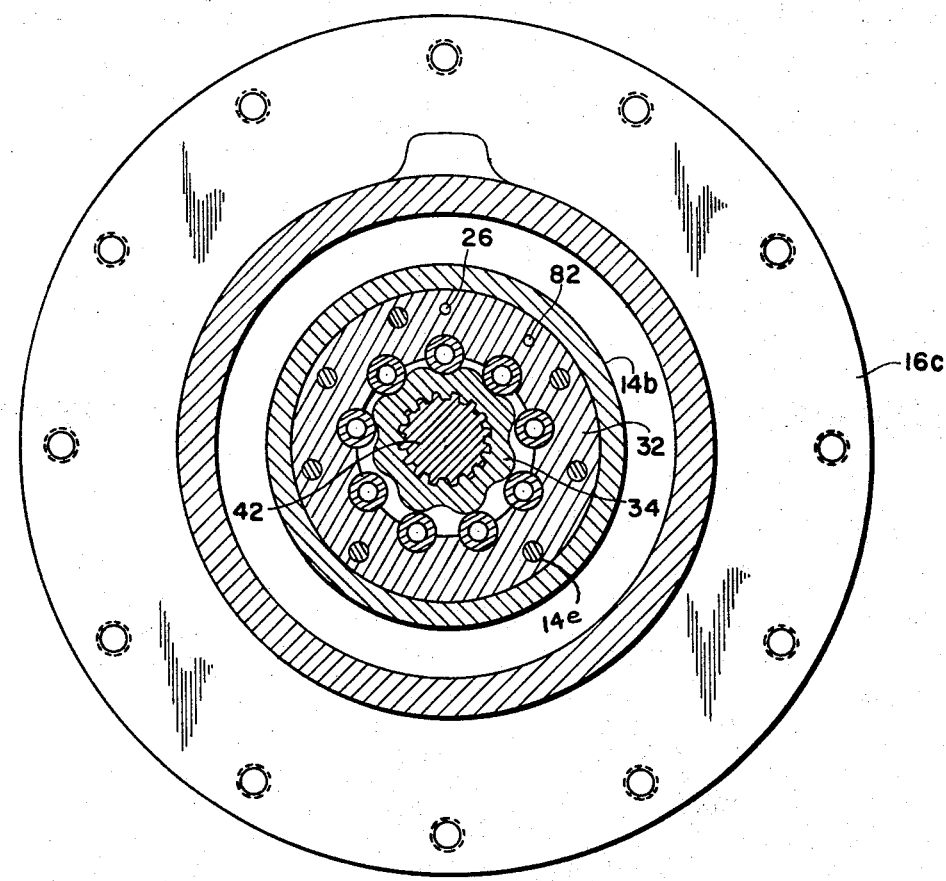
FIG. 5 is a cross sectional view taken along the line 5—5 of FIG. 2 showing further details of the internal construction of the motor wheel.
Figure 7:
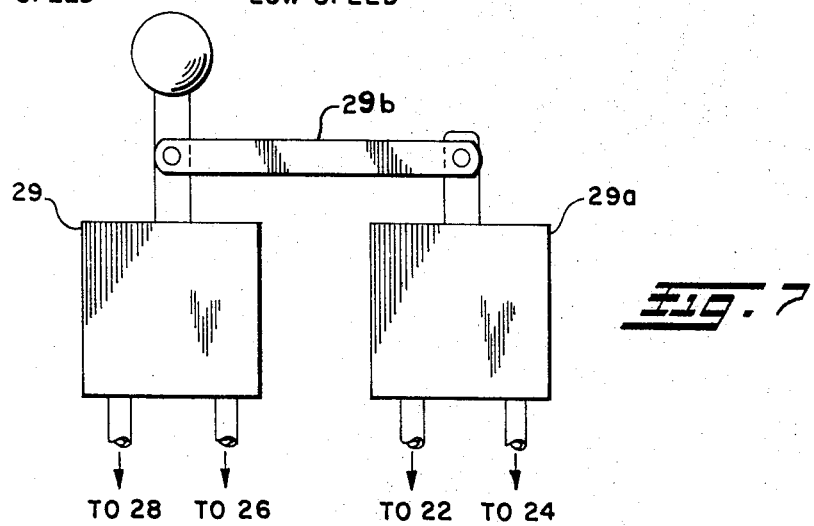
FIG. 7 is an enlarged view of one type of control valve arrangement which may be used in conjunction with the motor wheel of the instant application.

With reference to FIG. 2, the motor wheel 12 includes a housing 14 adapted to be mounted on the vehicle 10 and a casing 16 adapted to be mounted as the hub of a ground engaging vehicle drive wheel 13. The casing 16 is rotatably mounted relative to the housing 14 by means of a pair of large tapered roller bearings 18 and 20 disposed therebetween. The housing 14 is adapted to be connected to a variable displacement hydraulic pump (not shown) disposed on the vehicle by means of an inlet port 22 and an outlet port 24. The inlet port 22 and outlet port 24 may be reversed in function depending upon the desired direction of rotation of the motor wheel 12. The housing 14 is further provided with a one oil passage 26 and another separate oil passage 28. The oil passages 26, and 28 may be selectively pressurized by means of a two way open center hydraulic valve 29 disposed on the vehicle which is connected to a hydraulic pump (not shown). Another open center two way hydraulic valve 29a is provided to reverse direction of flow to ports 22 and 24. Link pin 29b connects the valve control handles for simultaneous operation. The purpose of the selectively pressurizable passages 26 and 28 and valves 29 and 29a will become more apparent from the description which follows hereinafter. For ease of manufacture, the housing 14 is comprised of a plurality of bolted together sections 14a, 14b and 14c. The casing 16 is likewise comprised of a plurality of bolted together sections 16a, 16b and 16c.

As shown in FIG. 2, a plurality of "O" ring or quad ring type seals one of which is generally designated 15 are incorporated to prevent leakage between various surfaces within the motor wheel 12 as will be evident to those skilled in the art.

Disposed within the housing 14 is a geroter type hydraulic motor 30. The geroter type motor is particularly advantageous for this application since this type of motor is substantially instantaneously reversible. The hydraulic motor 30 includes an internally toothed ring member 32 and an externally toothed star member 34 eccentrically disposed for rotational and orbital movement relative to the ring member. The teeth of these members intermesh to provide expanding and contracting fluid chambers upon relative orbital and rotational movement therebetween. A valve member 36 is provided in the housing and is connected to be driven in synchronism with either rotational movement of the externally toothed member by valve drive means 38. The valve member 36, thus is effective to sequentially connect the expanding and contracting chambers to the inlet port 22 and outlet port 24 thereby controlling fluid flow through the expanding and contracting chambers in synchronism with the movement of the externally toothed member.

A hydraulic motor of similar design and suitable for performing the function previously set forth is more fully disclosed and described in U.S. Pat. No. 3,572,983 issued to McDermott and assigned to the assignee of the present invention. The specification of that application is hereby incorporated by reference into this application.

A free floating drive shaft or dog-bone shaped member 40 is provided to transmit the driving orbital and rotary movement of externally toothed member 34 into useful output rotary torque for the wheel motor 12. The drive shaft 40 is configured with arcuately shaped spline 42 and arcuately hobbed gear teeth 44 respectively on the ends thereof. A thrust block 46 is provided to prevent axial movement of the drive shaft member 40. The arcuate splines or gear teeth on either end of the drive shaft 40 are necessary in order to transmit the rotary-orbital type motion of the externally toothed member 34 into the pure rotative torque effort necessary for operation of the wheel motor. It should be emphasized that the use of a free floating drive shaft member 40 in a device of this type is particularly advantageous because of the extremely high torque loads which must be transmitted. Since the shaft 40 is free floating, it may be permitted to seek its own center and thus more effectively transmit the torque load.

The wheel motor 12 is provided with a planetary gear set 50 wherein the arcuately toothed end 44 of shaft 40 may be considered a sun gear. The planetary gear set further includes a plurality of planet gears 54 rotatably disposed on planet gear shafts 56 which are in turn mounted in a planet carrier 58. The plane gears 54 are effective to transmit driving rotation between the sun gear or splined end 44 of shaft 40 and a ring gear 60 formed about the interior peripheral surface of section 16b of casing 16. The planet gear carrier 58 and associated planet gears 54 are slidably mounted for axial movement relative to the sun gear 44 and ring gear 60. The carrier 58 is further provided with a one clutch surface 62 and another clutch surface 64 disposed thereon. The clutch surface 62 is confronted by a corresponding clutch surface 66 on the housing and normally axially spaced therefrom. The clutch surface 64 of the carrier 58 is likewise confronted with a corresponding clutch surface 68 on the casing which is also likewise normally axially spaced from the corresponding surface 64 of the carrier. Depending on the frictional characteristic desired, elements in the form of bands 62a and 64a of, for example sintered metal, may be provided on the carrier surfaces 62 and 64 respectively to increase frictional drag upon actuation of the clutches.

A clutch actuating means 70 is provided to enable the carrier 58 to be moved axially to engage the clutch surface 62 of the carrier with the corresponding clutch surface 66 of the housing to thereby prevent relative rotation between the carrier and the housing. The clutch actuating means 70 includes a fluid supply passage 72 associated with selectively pressurizable passage 26 of the housing and an annular ring-shaped actuating shoe 74 received in a ring-shaped recess of the casing. Shoe 74 is advantageously provided with pressure balancing grooves 74a which are provided to prevent metal to metal contact between the shoe 74 and carrier 58. This surface is supplied with pressurized hydraulic fluid by means of holes 74b therein. Springs 76 and stake pins 78 are provided to prevent relative rotational movement between the actuating shoe 74 and the casing 16.

Another clutch actuating means 80 which is essentially identical to the clutch actuating means 70 is provided on the other side of the carrier and acts between the carrier and the housing. The clutch actuating means 80 comprises a fluid supply passage 82 (shown in phantom out of position in FIG. 2 for clarity) associated with selectively pressurizable passage 28 of the housing 14. An annularly shaped actuating shoe 84 is provided in a ring-shaped recess of the housing 14 to enable the carrier 58 to be selectively axially moved whereby clutching surface 64 of the carrier 58 may be brought into driving engagement with clutching surface 68 of the casing 16 to thereby prevent relative rotary movement between the casing and the carrier. Pressure balancing grooves 84a and supply passages 84b are likewise provided in shoe 84. Springs 86 and stake pins 88 are likewise provided to prevent relative rotary motion between the housing 14 and annular shoe 84. The springs 76 and 86 are likewise effective to maintain the carrier in a normally centered or neutral position to thereby enable free wheeling of the wheel motor 12 when neither of the passages 26 or 28 of the housing are pressurized by movement of the hydraulic valve 29 on the vehicle 10.

Additionally, flange 90 of casing 14 having a plurality of mounting holes 14d therein is advantageously provided for mounting of a disc type brake mechanism (not shown) to retard motion of the vehicle upon application thereof.

Additionally or alternatively, additional clutch means could be provided to lock other portions of the planetary gear set relative to either the casing or the housing to provide additional or alternative driving ratios.

DESCRIPTION OF OPERATION

When the operator of a vehicle desires to drive the vehicle, he must decide whether a very high starting torque is required as in starting on an uphill grade or with a very heavy load. If this is the case he would operate control valve 29 and simultaneously control valve 29a on the vehicle 10 to pressurize passages 24 and 26 thereby creating fluid pressure in passage 72 and behind clutch actuating shoe 74. This pressure behind clutch actuating shoe 74 would casue axial movement of the planetary carrier 58 to provide clutching engagement between surface 62 of the carrier and clutch surface 66 of the housing 14. Thus when passages 24 and 26 are pressurized, the motor wheel would supply a low speed-high torque forward rotation output. The flow of the pressurized hydraulic fluid from valve 29a would enter the housing at port 24 and leave the housing through port 22. After entering the housing, the hydraulic pressurized fluid would pass through the valve means 36 and into the expanding chambers between the internally toothed member 32 and the externally toothed member 34 thereby causing rotational and orbital motion of the externally toothed member. As the chamber contracts, hydraulic fluid will flow back out through the valve means to port 22, and return to the pump. Rotational and orbital motion of the externally toothed member 34 would cause rotation of drive member 40. The rotation of drive member 40 would be transmitted through the sun gear 44 at one end thereof to the planetary gears 54 which would in turn rotate about the planet gear shafts 56 thereby driving ring gear 60 and casing 16 at a predetermined ratio, for example 4:1. This is because the carrier 58 is locked to the housing 14 and thus the planet gear shafts 56 are likewise stationary relative to the housing. Torque is transmitted from the sun gear 44, to planetary gears 58 then directly to ring gear 60. In this position, the ring gear 60 rotates in the opposite direction from the sun gear 44.

When the vehicle reaches sufficient speed, the operator moves the control handle attached to valves 29 and 29a across neutral to the opposite position thereby pressurizing ports 22 and 28 and passage 82 associated with port 28 while simultaneously relieving pressure from ports 24 and 26 and passage 72 associated with port 26. This reverses direction of rotation of the hydraulic motor 30. Pressure behind shoe 84 moves carrier 58 to the left as shown in FIG. 2 to provide driving engagement between surface 64 of the carrier 58 and surface 68 of the casing. In this position the carrier 58 is locked for rotation with the casing 16. Since the carrier 58 now rotates with the ring gear 60, a direct or 1:1 gear ratio is provided. In other words, relative rotation between the sun gear 44 and the ring gear 60 is prevented in this clutch position. The casing 16 thus rotates directly with the sun gear 44, the planet gears 54 act merely as fixed members to transmit the torque. The ring gear 60 rotates in the same direction as the sun gear 44.

When it is desired to operate the motor wheel 12 to drive the vehicle in the reverse direction, the operator merely reverses the output flow from the variable displacement pump (not shown) on the vehicle as is well known in the art. Operation of the high speed and low speed control valves 29 and 29a remains the same as previously described. Thus direction of vehicle movement is controlled in a standard manner well known in the art.

If the operator desires to allow the vehicle to coast, he merely moves the handle attached to control valves 29 and 29a to the neutral position. When this happens, the springs 76 and 86 will center the carrier and the motor wheel will be in a free wheeling position. This feature is particularly advantageous for towing large construction vehicles at highway speeds and eliminates the need for a special trailer for this type of vehicle.

I claim:

1. A hydraulic motorized wheel for use as a drive wheel of a vehicle, said motorized wheel comprising
   a housing adapted to be mounted on a vehicle,
   a casing rotatably mounted relative to said housing,
   a hydraulically operated motor mounted on said housing having a rotatable drive shaft extending into said casing,
   a planetary gear set in said casing, the sun gear of said planetary gear set being driven by said drive shaft, said planetary gear set further including a planetary gear disposed in driving engagement with said sun gear, a planetary gear carrier mounted in said casing for relative sliding movement in either direction from a neutral position, said planetary carrier being freely rotatable relative to both said casing and said housing when in said neutral position, and a ring gear mounted in said casing in driving engagement with said planetary gear,
   first clutch means in said motorized wheel operable upon actuation thereof to move said planetary carrier in one direction from said neutral position to prevent relative rotation between said housing and said planetary carrier and to provide a first drive ratio, and
   second clutch means in said motorized wheel operable upon actuation thereof to move said planetary carrier in the other direction from said neutral position to prevent relative rotation between said casing and said planetary carrier to provide a second drive ratio.

2. The invention of claim 1 wherein said first and second clutch means are selectively actuatable by hydraulic pressure, and valve means in fluid communication with said hydraulic motor and both of said clutch means, said valve means being operable to reverse the direction of operating fluid flow to said hydraulic motor simultaneously with actuation of said second clutch means after actuation of said first clutch means to reverse rotation of said output shaft simultaneously with actuation of said second clutch means.

3. The invention of claim 1 wherein said hydraulic motor includes an externally toothed member, an internally toothed member, and motor valve means, said externally toothed member being operably associated with said drive shaft and eccentrically disposed relative to said internally toothed member for rotational and orbital movement relative to an axis thereof, the teeth of said members intermeshing to define expanding and contracting fluid chambers upon relative rotational and orbital movement therebetween, said motor valve means being connected to admit and exhaust fluid from said chambers in synchronism with one of the movements of said externally toothed member.

4. The invention of claim 3 wherein the drive shaft of said hydraulic motor includes splined portions thereon, and said externally toothed member has a splined bore therein, one of said splined portions of said drive shaft being drivingly received in the splined bore of said externally toothed member, another of said splined portions being the sun gear for said planetary gear set.

5. A hydraulic motorized wheel for use as a drive wheel vehicle, said motorized wheel comprising
a housing adapted to be mounted on a vehicle,
a casing rotatably mounted relative to said housing,
a hydraulically operated motor mounted on said housing having a rotatable drive shaft extending into said casing,
a planetary gear set in said casing, the sun gear of said planetary gear set being driven by said drive shaft, said planetary gear set further including a planetary gear disposed in driving engagement with said sun gear, a planetary gear carrier mounted in said casing for normally free rotation relative to both said casing and said housing, and a ring gear mounted in said casing in driving engagement with said planetary gear, said planetary gear carrier being axially slidable relative to said ring and sun gear in either direction from an initial neutral position where said planetary carrier is freely rotatable relative to both said casing and said housing,
first clutch means in said motorized wheel operable upon actuation thereof to prevent relative rotation between said housing and said planetary carrier and to provide a first drive ratio, said first clutch means including pressure actuatable means for moving said carrier in one direction from said neutral position,
second clutch means in said motorized wheel operable upon actuation thereof to prevent relative rotation between said casing and said planetary carrier to provide a second drive ratio, said second clutch means including pressure actuatable means for moving said carrier in the other direction from said initial neutral position, and means normally biasing said carrier toward said initial neutral position.

6. The invention of claim 5 wherein said first and second clutch means comprise first and second clutching surfaces on said carrier and corresponding adjacent clutching surfaces on said housing and said casing respectively.

7. The invention of claim 6 wherein a first element of clutch frictional material is disposed between the first clutching surface on said carrier and the corresponding surface on said housing, and a second element of clutch frictional material is disposed between the second clutching surface on said carrier and the corresponding surface on said casing.

8. The invention of claim 7 wherein said first clutch means includes a first piston received in a recess in said casing, said first piston having a bearing surface disposed for abutting engagement with a bearing surface of said carrier, said second clutch means including a second piston received in a recess in said housing, said second piston having a bearing surface disposed for abutting engagement with a bearing surface of said carrier, and wherein the biasing means for normally biasing said carrier toward said initial neutral position comprise biasing means acting between said casing and said first piston and said housing and said second piston to constantly urge said surfaces toward abutting engagement and to thereby urge said carrier toward the initial neutral position.

9. The invention of claim 5 wherein said first and second pressure actuatable means comprise annular pistons received in recesses in said casing and said housing respectively on opposite sides of said carrier and selectively pressurizable passage means in said casing and said housing communicating with said recesses.

10. The invention of claim 9 wherein said means normally biasing said carrier toward said initial neutral position comprise springs acting between the casing and its associated piston and the housing and its associated piston thereby biasing said pistons into engagement with said carrier and thereby biasing said carrier toward said initial neutral position.

11. A hydraulic motorized wheel for use in a vehicle, said motorized wheel comprising a housing adapted to be mounted on a vehicle, a casing mounted on said housing for rotation relative thereto, a reversible rotary hydraulic motor disposed on said housing and having rotatable output shaft extending into said casing, a planetary gear set disposed in said casing, said planetary gear set including a sun gear, planetary gears, planetary gear carrier means and a ring gear, the sun gear of said planetary gear set being drivingly connected for rotation with the output shaft of said hydraulic motor, first clutch means operable upon actuation thereof to prevent rotation of said casing relative to said sun gear to thereby provide a first drive ratio between said output shaft and said casing, second clutch means operable upon actuation thereof to prevent rotation of another portion of said planetary gear set relative to said housing to thereby provide a second driving ratio between said output shaft and said casing, a first valve in fluid communication with said motorized wheel, said first valve being operable to selectively actuate said first and second clutch means, and a second valve in fluid communication with said motorized wheel, said second valve being operable to control the direction of operating fluid flow to said hydraulic motor thereby controlling the direction of rotation of said output shaft, said first and second valve means being interconnected for simultaneous operation whereby said output shaft will be caused to rotate in one direction upon actuation of said first clutch means and in the opposite direction upon actuation of said second clutch means.

* * * * *